United States Patent
Schleifer et al.

(10) Patent No.: US 8,798,092 B2
(45) Date of Patent: Aug. 5, 2014

(54) CROSS LANGUAGE OBJECT SHARING

(75) Inventors: Jason Schleifer, Cambridge, MA (US); Richard Zack Speyer, Cambridge, MA (US); John R. Burkhardt, Arlington, MA (US); Ransom Richardson, Beverly, MA (US); Steven Lees, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 488 days.

(21) Appl. No.: 13/117,494

(22) Filed: May 27, 2011

(65) Prior Publication Data
US 2012/0303704 A1    Nov. 29, 2012

(51) Int. Cl.
*H04L 12/28* (2006.01)
*H04J 1/16* (2006.01)

(52) U.S. Cl.
USPC ........... 370/463; 370/252; 370/230; 370/386; 709/203

(58) Field of Classification Search
USPC .................... 370/252, 230, 463, 386; 709/203
See application file for complete search history.

(56) References Cited

U.S. PATENT DOCUMENTS

| | | | |
|---|---|---|---|
| 6,349,343 B1 | 2/2002 | Foody et al. | |
| 7,587,721 B2 | 9/2009 | Schmidt et al. | |
| 7,681,184 B1 | 3/2010 | Weedon et al. | |
| 2007/0100967 A1* | 5/2007 | Smith et al. | 709/219 |
| 2009/0234804 A1 | 9/2009 | Whitechapel et al. | |

OTHER PUBLICATIONS

Wiegiel, et al., "Cross-language, Type-safe, and Transparent Object Sharing for Co-located Managed Runtimes", UCSB Technical Report, Jun. 2010, In proceedings of the ACM international conference on Object oriented programming systems languages and applications, Jun. 22, 2010, 17 pages.

"In-process Cross-language Object Interaction: Adapters or Navigators?", Szegedi.org, 5 pp., Published May 4, 2007, Available at: http://www.szegedi.org/articles/wrappersOrNavigators.html.

Kuhn, Bradley M., "JVM to .NET: I'm Not Dead Yet!", 2 pp., Published Feb. 15, 2001, Available at: http://onjava.com/pub/a/onjava/2001/02/15/jvm.html.

Kaye, Robert, "Language Musings", 3 pp., Published Nov. 14, 2004, O'Reilly Digital media, Available at: http://blogs.oreilly.com/digitalmedia/2004/11/language-musings.html.

* cited by examiner

*Primary Examiner* — John Pezzlo
(74) *Attorney, Agent, or Firm* — Aaron Chatterjee; Brian Haslam; Micky Minhas

(57) ABSTRACT

Methods, system, and computer storage media are provided for enabling cross-language object sharing by providing shareable typename information agreed upon by clients that wish to share object with each other. A first client creates an object by communicating a create request, which includes typename information associated with the object. The object is created and the typename information, along with data and properties associated with the object, is stored. A second client requests to open that object. The data, properties, and typename information stored in associated with the object is communicated to the second client so that the second client is able to create a correct instance of the object.

20 Claims, 5 Drawing Sheets

CROSS LANGUAGE OBJECT SHARING

BACKGROUND

With improved connectivity and access of computers and other devices to various networks, it has become commonplace for different programs, or clients, to share access to the same information, such as data objects. Sharing of data objects enables the sharing of information in real-time across multiple, disparate clients, such as machines that are running multiple pieces of technology. Current techniques used to share information, such as data objects, between clients that utilize different languages are fairly limited and are inherently problematic. For instance, programs may implement their own mechanisms for sharing data, but doing so is generally cumbersome for the programmer, considering how much information may be shared among computers and other devices.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to the sharing of data objects between clients of disparate languages, such as strongly typed and dynamically typed languages. According to embodiments of the present invention, upon creation of an object, the client provides typename information associated with the object such that when a request is received in the future to open that object, the typename information can be provided to the requesting client to enable that client to create a correct instance of the object. In this case, the typename information is not language specific, but is shareable among various language types. While strongly typed languages have typenames and fixed properties, dynamically typed languages do not have a type system, nor do they have fixed properties. As such, typenames provided to a server when creating an object are friendly, shareable names agreed upon by the clients who will be sharing the objects. Instead of typenames consisting of a language-specific string, typenames are shareable by all languages, even languages that have yet to be developed.

BRIEF DESCRIPTION OF THE DRAWINGS

The present invention is described in detail below with reference to the attached drawing figures, wherein.

DETAILED DESCRIPTION

Figure 1:
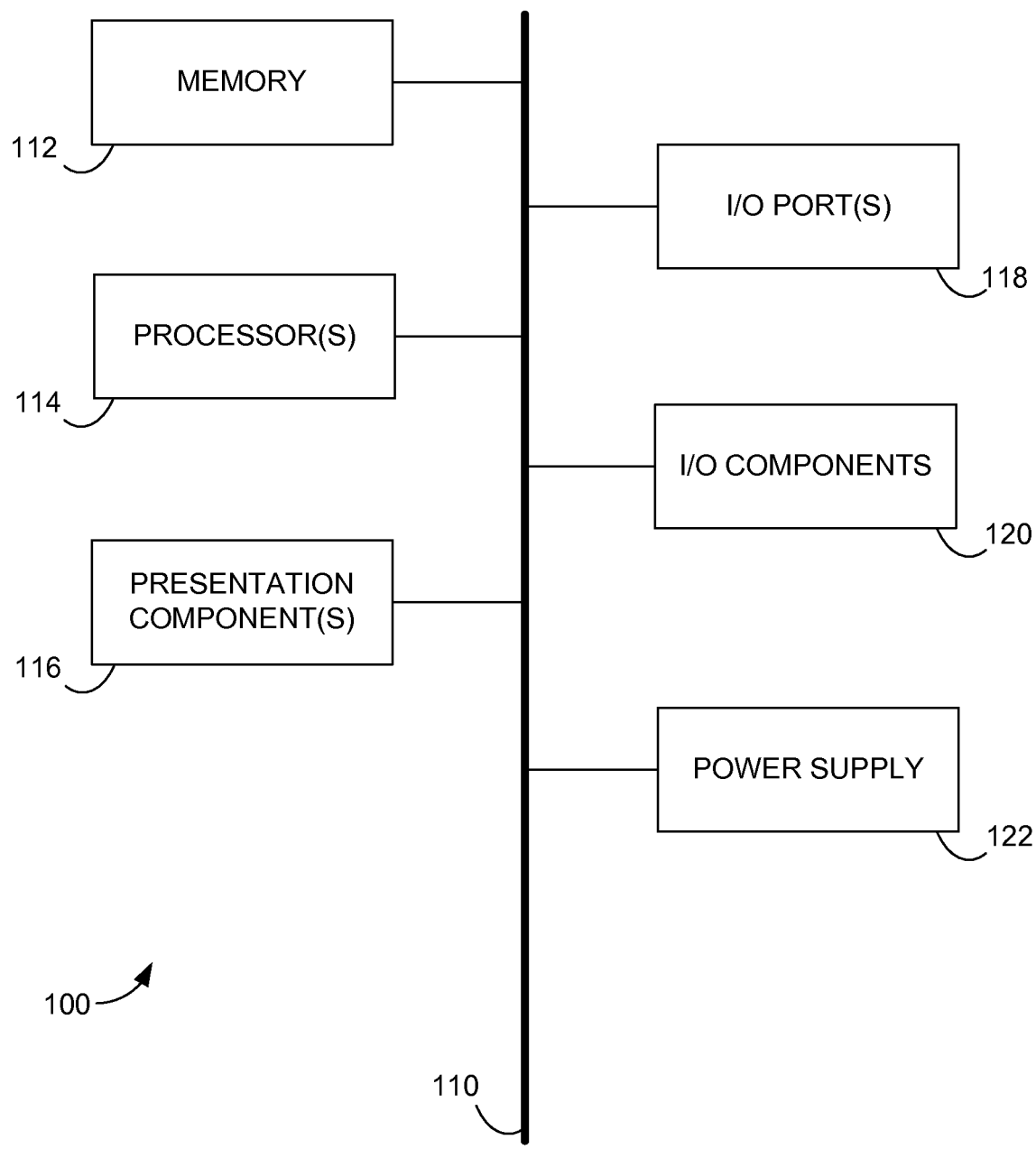
FIG. 1 depicts a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to storing typename information at a server or data store for objects such that when a client requests to open a particular object, typename information is communicated to that client. Typenames, according to embodiments of the present invention, are friendly, shareable typenames that are agreed upon in advance by a plurality of clients who will be sharing objects such that the typenames are not language-specific, but can be understood by many languages, even those languages that do not currently exist but that may be developed in the future. Typename information is provided to the object server when an object is created so that this information can be stored and communicated to any client who requests to open that particular object in the future. The client utilizes the typename information to create a correct instance of that object. Once an object is created by a client, the object may be updated by that client or other clients who have previously agreed (e.g., by way of an implicit contract) as to the structure of the object based on the agreed upon typename information that is shared between multiple clients with programs written in various languages, including strongly typed and dynamically typed languages.

Accordingly, in one aspect, an embodiment of the present invention is directed to one or more computer storage media storing computer-useable instructions that, when used by one or more computing devices, cause the one or more computing devices to perform a method of enabling cross-language object sharing. The method includes receiving from a first client a create request to create an object. The create request includes typename information associated with the object. Further, the method includes creating the object according to the create request, storing the typename information, one or more properties of the object, and data associated with the object, and receiving from a second client an open request to open the object. The method additionally includes communicating the data associated with the object, the one or more properties associated with the object, and the typename information for the object to the second client. The second client, using the typename information, is able to correctly utilize the data to create a correct instance of the object.

In another embodiment, an aspect of the invention is directed to one or more computer storage media storing computer-useable instructions that, when used by one or more computing devices, cause the one or more computing devices to perform a method of enabling cross-language object sharing. The method includes storing, at a server, data, typename information, and properties associated with a plurality of objects that have been created for use by a plurality of clients. The plurality of clients have previously agreed on a structure of the plurality of objects based on the typename information corresponding to each of the plurality of objects. The method further includes receiving an open request from a first client of the plurality of clients to open an object of the plurality of objects, wherein the client utilizes a strongly typed language, retrieving from the server the data, the typename information, and the properties associated with the requested object, and communicating the data, the typename information, and the properties associated with the requested object to the client such that the client, using the typename information, is able to create a correct instance of the object.

A further embodiment of the present invention is directed to an object sharing system including one or more computing devices having one or more processors and one or more computer storage media. The object sharing system includes a create request receiving component that receives from a dynamically typed client a create request to create an object. The create request includes typename information associated with the object, and wherein the dynamically typed client utilizes a dynamically typed language. The system further includes an object creation component that creates the object according to the create request and a storing component that stores the typename information, one or more properties of the object, and data associated with the object. Additionally, the system includes an open request receiving component that receives from a strongly typed client an open request to open the object. The strongly typed client utilizes a strongly typed language. The system also includes a communication component that, upon a notification that the open request has been received, communicates the data associated with the object, the one or more properties associated with the object, and the typename information for the object to the strongly typed client such that the strongly typed client, using the typename information, is able to correctly utilize the data to create a correct instance of the requested object.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
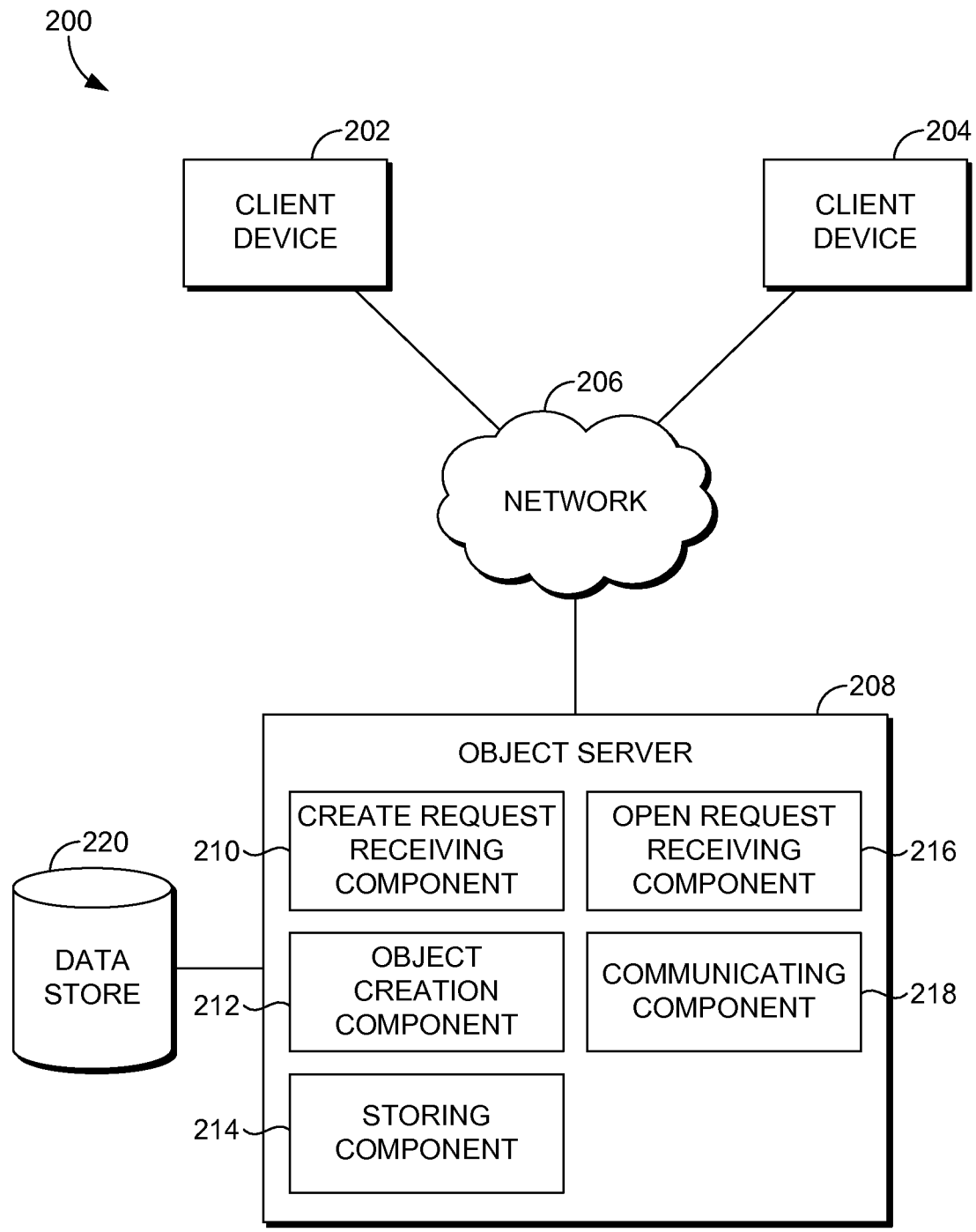
FIG. 2 depicts a block diagram that illustrates a computing environment suitable for embodiments of the present invention.

Referring now to FIG. 2, a block diagram is provided illustrating an exemplary computing system environment 200 suitable for use in implementing embodiments of the present invention. It will be understood and appreciated by those of ordinary skill in the art that the computing system environment 200 shown in FIG. 2 is merely an example of one suitable computing system environment and is not intended to suggest any limitation as to the scope of use or functionality of embodiments of the present invention. Neither should the computing system environment 200 be interpreted as having any dependency or requirement related to any single module/component or combination of modules/components illustrated therein. Among other components not shown, the system 200 includes client devices 202 and 204, object server 208, and a data store 220, all in communication with one another through a network 206. The network 206 may include, without limitation, one or more local area networks (LANs) and/or wide area networks (WANs). Such networking environments are commonplace in offices, enterprise wide computer networks, intranets, and the Internet. Accordingly, the network 206 is not further described herein.

In some embodiments, one or more of the illustrated components/modules may be implemented as stand-alone applications. In other embodiments, one or more of the illustrated components/modules may be integrated directly into other components. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers, client devices, or the like. By way of example only, object server 208 might reside on a larger server, cluster of servers, or a computing device remote from one or more of the remaining components.

Objects, as used herein, refer to any entity that is able to be manipulated by commands of one or more programming languages, such as value, variable, function, or data structure. In software development, objects are used to implement abstract data structures by bringing together the data components with the procedures that manipulate them. Properties are generally characterized by three distinct properties. These properties include (1) an identity of the object (the property of an object that distinguishes it from other objects); (2) a state that describes the data stored in the object; and (3) behavior, which describes methods in the object's interface by which the object can be used. An object stores its state in fields, or variables in some programming languages, and exposes its behavior through methods or functions in some programming languages. Many instances of a particular object may exist, and thus these instances belong to a particular class, which is the blueprint from which individual objects are created.

While clients utilizing or written in different programming languages are typically unable to share the same objects, embodiments of the present invention enable cross-language object sharing. For instance, while strongly typed languages, such as Java, C#, Pascal, Ada, C, or C++, have typenames and fixed properties, dynamically typed languages, such as APL, Erlang, Groovy, JavaScript, Lisp, Lua, MATLAB/GNU Octave, Perl, PHP, Prolog, Python, Ruby, Smalltalk, Clojure, or Tcl, do not have a type system with fixed properties. These differences make object sharing inherently problematic. Embodiments of the present invention provide an explicit type resolution where developers provide a type resolver that maps from a concrete strong type into a shareable typename. For example, a strongly typed class of Microsoft.Foo.Bar could map to the C++ type CBar and to a dynamic JavaScript object that is filled with matching properties. The developer creates a direct 1:1 mapping between types it wants to share and friendly, shareable names. A prerequisite is that all clients agree on the same typename such that objects can be shared across clients of all language types. As used herein, a typename is any uniquely identifiable piece of information. In one embodiment, the typename is a human readable string, such as "Square" or "PersonV1," but it could also be any unique binary value or number.

Javascript (and other dynamically typed languages) and C# (and other strongly typed languages) have inherently distinct approaches to object typing. While C#, C, C++, etc. are traditional strongly typed languages, Javascript is dynamic and provides an extremely high level of flexibility. An object server, as further described herein, can be used to provide metadata about an object when that object is being requested so that strong typing can be enforced on the strongly typed clients. In some instances, a resolver may be used so that types in strongly typed languages can be mapped to string and strings can be mapped back into types in strongly typed languages. The resolver enables bidirectional mapping between a developer-specified typename and a strong type in a language, such as C#. In embodiments, resolvers are used only for strongly typed languages, and not for dynamically typed languages. For instance, when an object payload is received at a strongly typed client, the registered resolver would retrieve the language-specific typename. If a type resolver is not specified, the system may attempt to construct the type using the typename information associated with the object. If that fails, the object will default to load into a dynamic object, although most strongly typed languages do not support dynamic objects. Object versioning is also possible, such that if a version change occurs in a strongly typed object, developers may have the option of changing the typename to indicate a version change.

Another aspect to the present invention is the implicit type resolution. In the implicit model, the type resolution is all done implicitly by each client. For example, a .NET client, when it opens a shared object of name "MyBar" would provide the concrete .NET type it expects to be filled with shared information. The .NET client would then fill that type with information based on the set of shared properties the server has a record of. The server, in this scenario, is not provided with a friendly or shared typename. In one embodiment, the system can run in a mixed mode where some clients are using implicit type resolution and others are using explicit type resolution. The named shared object and named shared collection on all clients must implicitly agree as to which properties those objects and collections contain. In both scenarios, both implicit and explicit, the client may specify whether it wants tight or loose binding for missing properties. If loose binding is specified, the strongly typed object is allowed to contain only a subset of the properties that the server has for that particular object. In a tightly bound configuration, the client would receive an error while trying to open a shared object with properties that don't map exactly to the server view of the object.

With continued reference to FIG. 2, each of the client devices 202 and 204, and the object server 208 may be any type of computing device, such as computing device 100 described with reference to FIG. 1, for example. The components may communicate with each other via a network 206, which may include, without limitation, one or more local area networks (LANs) and/or wide area networks (WANs). Such networking environments are commonplace in offices, enterprise wide computer networks, intranets, and the Internet. It should be understood that any number of client devices, servers, and data stores may be employed within the system 200 within the scope of the present invention. Each may comprise a single device or multiple devices cooperating in a distributed environment. For instance, the object server 208 may comprise multiple devices arranged in a distributed environment that collectively provide the functionality of the object server 208 described herein. Additionally, other components not shown may also be included within the system 200, while components shown in FIG. 2 may be omitted in some embodiments.

The client devices 202 and 204 may be any type of computing device owned and/or operated by a client that can access the network 206. For instance, each of the client devices 202 and 204 may be a desktop computer, a laptop computer, a tablet computer, a mobile device, or any other device having network access. Generally, a client may employ the client devices 202 and 204 to, among other things, create a program using a particular programming language that can create and request shareable objects from the object server 208.

The object server 208 comprises multiple components, some of which are illustrated in FIG. 2. These include a request receiving component 210, an object creation component 212, a storing component 214, an open request receiving component 216, and a communicating component 218. In one embodiment, the create request receiving component 210 receives a create request from a client to create an object. The client that requests creation of an object may be implemented in either a strongly typed or dynamically typed language. The create request includes typename information, which is stored at the server or in a data store in association with the object data and properties. The client that creates an object may utilize a strongly typed language or a dynamically typed language. As dynamically typed languages don't have typenames as do strongly typed languages, embodiments of the present invention provide for a client that utilizes a dynamically typed language or for a client that utilizes a strongly typed language to provide a friendly, shareable, non-language specific typename when creating a new object, which allows for sharing of the newly created object between clients of disparate languages. For instance, a strongly typed client (e.g., a client that utilizes a strongly typed language) may now be able to open an object created by a dynamically typed client (e.g., a client that utilizes a dynamically typed language), as typename information is now available and can be used by strongly typed clients to create a correct instance of that object. Each time a strongly typed client instantiates an instance of a particular object, the computer will allocate memory to have a place to store various data that comprises the object. For instance, for the class "person," at least two properties may be associated with that class, including first name and last name, such that each time an object belonging to the class "people" is opened, a computer running a strongly typed language client will allocate memory to have a place to store a first and last name. If the client wants to add an address field, the source code would have to be changed, recompiled, and the class's definition would have to be modified to add an address field or property. Regardless of whether the client requesting creation of an object is implemented in a dynamically typed or strongly typed language, typename information is provided to the server upon creation of an object.

The object creation component 212 is configured to create an object according to the create request received by the create request receiving component 210. Further, the storing component 214 is configured to store various types of information associated with the object, including data that comprises the object, properties associated with the object, and typename information that has been assigned to that particular object or class of objects. The storing component 214, in one embodiment, is configured to communicate the object information to be stored in the data store 220. While just one data store 220 is illustrated in FIG. 2, multiple data storage units may be utilized to practice embodiments of the present invention.

The open request receiving component 216 is configured to receive open requests from clients to open a particular object. The object information that is sent along with the open request may vary from instance to instance, and from client to client. For example, strongly typed clients may know the typename of a particular object that it wants to open, and as such may send this information to the object server 208, and particularly the open request receiving component 216, along with the open request. Dynamically typed clients, on the other hand, may not know the actual typename associated with a particular object, as they typically do not use typenames, and as such may not send the actual typename along with the open request. Instead, in one embodiment, dynamically typed clients may send typename information (e.g., hint or alias) which corresponds to the typename information agreed upon by the clients ahead of time. As such, the typename information works across different languages and basically operates as an alias as to the actual typename on the different shared languages. In one embodiment, the typename information (e.g., hint or alias) is defined by the developer such that multiple hints can map to the same system typename, or actual typename. The object server 208 may do a comparison to determine whether the typename information provided by the client matches the typename information stored at the server or in a data store, such as the data store 220. If the object server 208 or one of its components determines that the typename information matches (e.g., person versus Foo.person), the object information will be communicated to the requesting client with the typename information stored at the object server 208. But if the typename information does not match (e.g., toaster versus person), an error message may be generated and sent to the requesting client. In one instance, the object server 208 sends the object information back to the requesting client, but indicates that it may not be the object that the client is expecting or searching for. The object server 208 stores the typename for a given object, but may not have a way to enforce that the object matches the type. As such, it may be the responsibility of the clients to obey their implicit contract that defines typename information for each object, wherein the typename information is sharable across different languages.

In one embodiment, after an open or create request is made to the object server, the object server may include the following in its response to the client: OpenObject "President1" (TypeName="Person", Properties FirstName=George LastName=Washington. In this embodiment, the object server has stored the type information of "Person" so that when it receives this typename information from the client, it can match which object the client is requesting. The object server can then determine that "Person" typename information corresponds to the stored typename of "Foo.Person," which is returned to the requesting client along with data and properties associated with that object.

The communicating component 218 is configured to communicate object information to the requesting client upon receiving a notification that the open request has been received at the object server 208, or more particularly at the open request receiving component 216. As mentioned, the object information may include typename information, data, and properties associated with the object.

Figure 3:
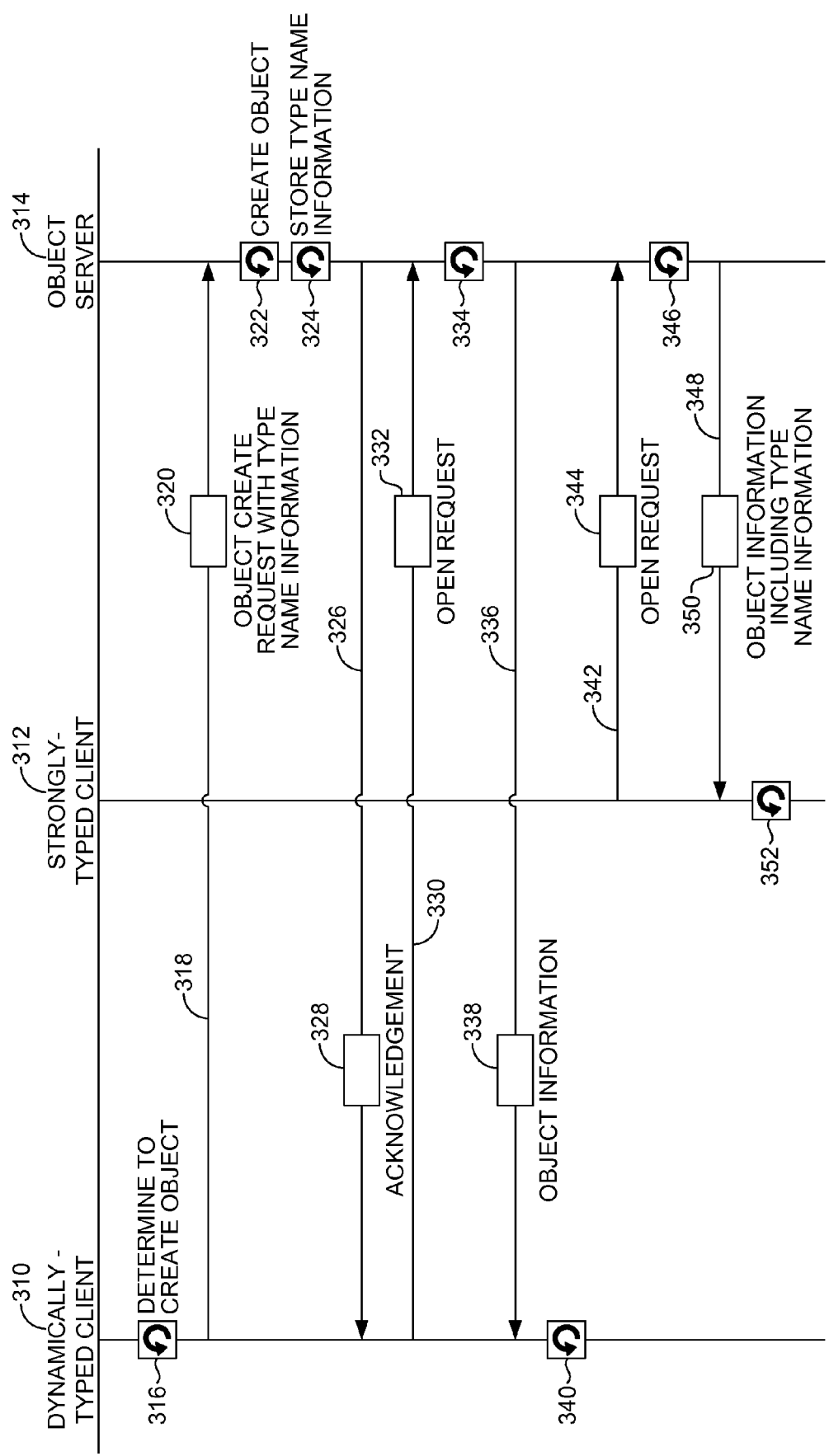
FIG. 3 illustrates a flow chart showing a method for creating and opening shared objects, according to an embodiment of the present invention.

Turning to FIG. 3, a flow chart is illustrated showing a method 300 for creating and opening shared objects, according to an embodiment of the present invention. The components of FIG. 3 include a dynamically typed client 310, a strongly typed client 312, and an object server 314. What is meant by a dynamically typed client is a client that is programmed utilizing a dynamically typed language. What is meant by a strongly typed client is a client that is programmed utilizing a strongly typed language. Examples of each language type are provided herein. At step 316, the dynamically typed client 310 determines to create a new object and, as such, communicates 318 an object create request 320 to the object server 314. The object create request 320 includes typename information that can be used by other clients that open this object in the future, as the typename information indicates to the clients how to create a correct instance of the object for their specific programming language type. At step 322, the object server 314 creates the object according to the object create request 320 and stores the typename information and other object information (e.g., data and properties) at step 324.

The object server 314 communicates 326 an acknowledgement 328 to the dynamically typed client 310 acknowledging that the object has been created. At this point, any other client, either dynamically typed or strongly typed, may elect to open the object that was just created. As shown here, initially a dynamically typed client 310 attempts to open the object. While it is shown in FIG. 3 that the same dynamically typed client 310 that created the object is now opening it, any other dynamically typed client could also open the object in the same manner. The dynamically typed client 310 communicates 330 an open request 332 to the object server 314. The object server 314, at step 334, may access a data store to determine and locate the object information stored in association with the requested object. In one embodiment, typename information, data, and properties associated with the object are located by the object server 314 at step 334. This object information 338 is communicated 336 to the requesting client, or here the dynamically typed client 310. The dynamically typed client 310 may then use the object information 338 at step 340 to instantiate the correct instance of the object according to its particular language type.

Next, a strongly typed client 312 attempts to open the object that was previously created. The strongly typed client 312 communicates 342 an open request 344 to the object server 314. Because the requesting client utilizes a strongly typed language, the open request, in one embodiment, includes the typename information. In another embodiment, however, the particular strongly typed client 312 that is requesting to open the object may be a client that is utilizing a new programming language, and thus may not know the type information. Alternatively, a program using new program logic may expect or require that a particular object is a "person" (which could resolve to "Foo.person"), in which case it could provide "person" as the typename to the object server to have the server enforce the type match. Or, it may not know the type of the object ahead of time and just create the object after learning the typename from the server and resolving it. In either case, the object server 314, at step 346, accesses a data store to identify the object information that it needs to send to the requesting client. The object server 314 communicates 348 the object information 350, including the typename information, to the strongly typed client 312. The strongly typed client 312 then uses the typename information at step 352 to instantiate the correct instance of the object, based on its particular language.

Figure 4:
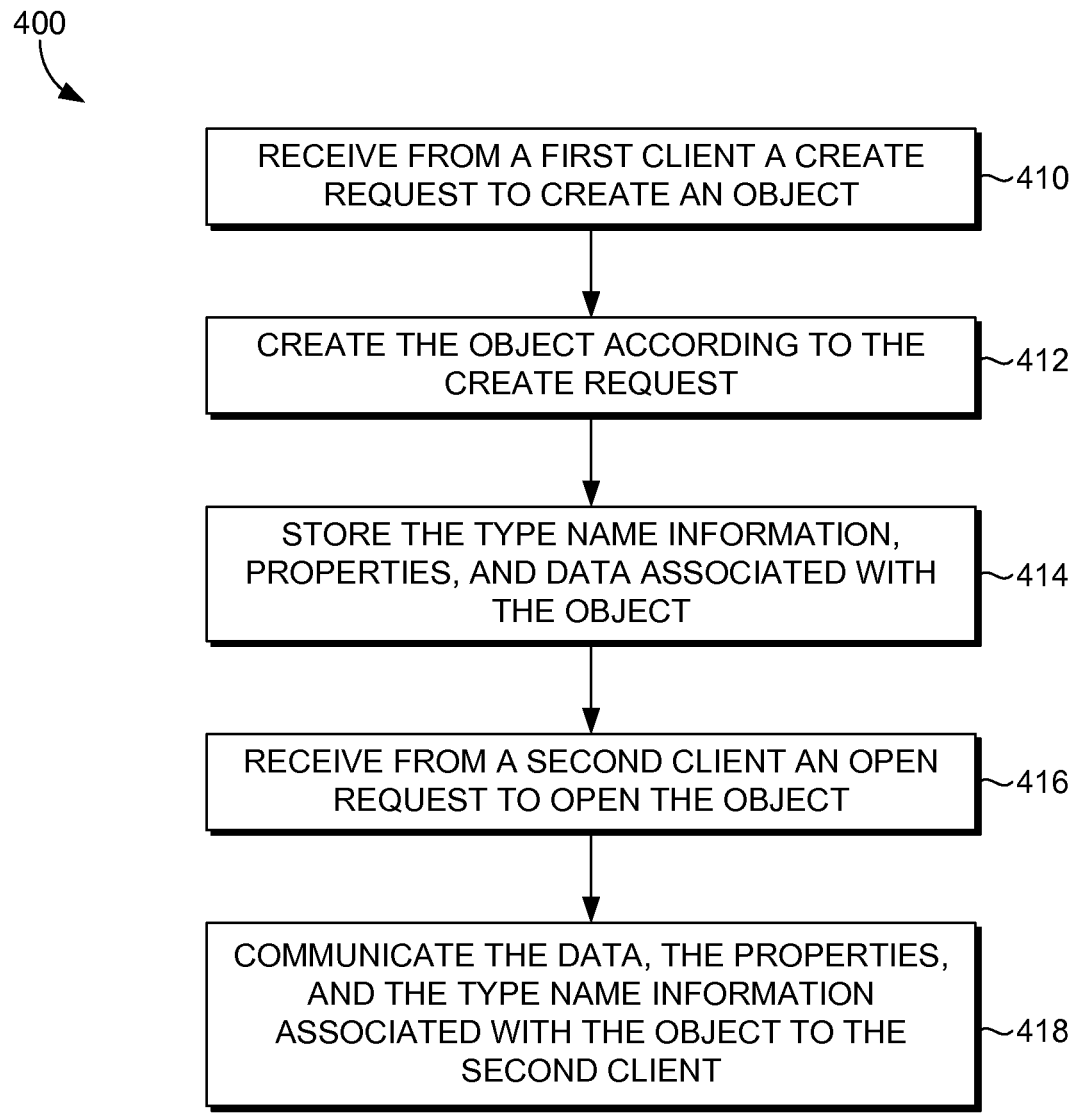
FIG. 4 illustrates a flow diagram showing a method for enabling cross-language object sharing, in accordance with an embodiment of the present invention.

FIG. 4 illustrates a flow diagram showing a method 400 for enabling cross-language object sharing, in accordance with an embodiment of the present invention. Initially, at step 410, a create request is received from a first client to create an object. The create request includes typename information associated with the object. The typename information, in one embodiment, is not language-specific, and thus can be read and understood by nearly any programming language, which enables cross-language object sharing, as described herein. For instance, prior to creating objects, clients utilizing a variety of languages may agree on typename information such that they all know, ahead of time, how to handle objects associated with various typenames. The first client may be a client that utilizes a dynamically typed language, such as APL, Erlang, Groovy, JavaScript, Lisp, Lua, MATLAB/GNU Octave, Perl, PHP, Prolog, Python, Ruby, Smalltalk, Clojure, or Tcl, or a client that utilizes a strongly typed language, such as Java, C#, Pascal, Ada, C, or C++. At step 412, the object is created according to the create request. The typename information, properties, and data associated with the object are stored at step 414. The data associated with the object may include key value pairs, including a field name and values for that field. In one embodiment, this object information is stored on a server or on a data store accessible by the server. An open request to open the object is received from a second client at step 416.

In one embodiment, the first client and the second client utilize different language types. For instance, if the first client utilizes a dynamically typed language, then the second client utilizes a strongly typed language, but if the first client utilizes a strongly typed language, then the second client utilizes a dynamically typed language. In an alternate embodiment, both the first and second clients utilize the same type of language, but different languages. At step 418, the data, properties, and the typename information associated with the object are communicated to the second client so that the second client is able to correctly utilize the data to create a correct instance of the object using the typename information. In embodiments, creating the correct instance of the object includes creating a container of an appropriate size for the data that comprises the object. Without the typename information, the second client, especially if utilizing a strongly typed language, would now know how to create the correct instance of the requested object. In one instance, the second client may utilize a programming language that is well-known and that has been used for some time. In another instance, however, the second client may utilize a newly developed programming language, and without embodiments of the present invention, that client would not know what to do with the object information it receives, such as if it didn't know what to do with the typename information that it receives. Further, for a strongly typed language, the developer may need to provide a mapping from the typename to a type that it defines. Regardless of whether the language is new or not, as long as it is strongly typed.

As mentioned, strongly typed languages, as used herein, are those programming languages that require all variables to have a defined type. Dynamically typed languages, to the contrary, are high-level programming languages that execute at runtime many common behaviors that other languages, such as strongly typed languages, might perform during compilation, if at all. These behaviors could include extension of the program, by adding new code, by extending objects and definitions, or by modifying the type system, all during program execution.

In one embodiment, the typename information provided by the second client is different than the typename information stored by the server, for example. If the typename information received by the second client is different than that stored on the server, an error message may be communicated to the second client indicating that it has requested to open an object that may not exist, or that the second client has provided inaccurate information. However, in that case that the typename information provided by the second client matches to the typename information stored at the server, the data, properties, and typename information associated with the object are communicated to the second client. The second client may have provided a hint or alias as to the actual typename of the request object.

Figure 5:
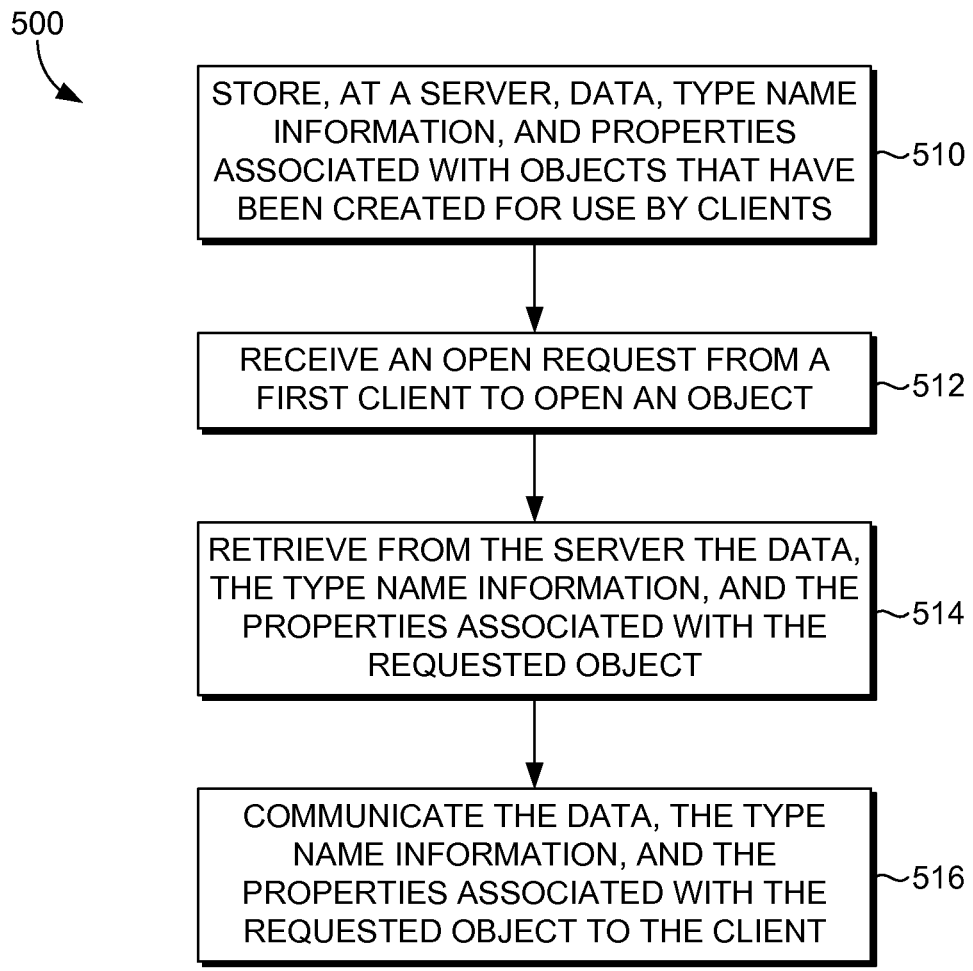
FIG. 5 illustrates a flow diagram showing a method for enabling cross-language object sharing, in accordance with an embodiment of the present invention.

Referring to FIG. 5, a flow diagram is illustrated of method 500 for enabling cross-language object sharing, in accordance with an embodiment of the present invention. At step 510, data, typename information, and properties associated with a plurality of objects are stored at a server. The objects have been created by a plurality of clients that have previously agreed on how to share the object based on typename information. At step 512, an open request is received from a first client to open an object that has already been created. In one instance, the first client utilizes a strongly typed language. The data, typename information, and properties associated with the requested object are retrieved from the server at step 514 to send back to the first client. This object information is communicated to the client at step 516 such that the client, using the typename information, is able to create a correct instance of the object. In embodiments, the typename information comprises a typename associated with the object that is not language specific. In one instance, the typename is associated with the object at the time of the object's creation such that the client that creates the object is responsible for providing a typename to the server when the object is created. For example, the object may have been created by a second client that utilizes either a dynamically or strongly typed language.

As can be understood, embodiments of the present invention provide for cross-language object sharing. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more tangible computer storage devices storing computer-useable instructions that, when used by one or more computing devices, cause the one or more computing devices to perform a method of enabling cross-language object sharing, the method comprising:
   receiving from a first client a create request to create an object, wherein the create request includes typename information associated with the object;
   creating the object according to the create request;
   storing the typename information, one or more properties of the object, and data associated with the object;
   receiving from a second client an open request to open the object; and
   communicating the data associated with the object, the one or more properties associated with the object, and the typename information for the object to the second client, wherein the second client, using the typename information, is able to correctly utilize the data to create a correct instance of the object.

2. The one or more devices of claim 1, wherein the typename information, the one or more properties of the object, and the data associated with the object are stored on a server.

3. The one or more devices of claim 2, wherein the open request comprises identical typename information to that stored on the server.

4. The one or more devices of claim 2, wherein if the typename information provided by the second client is different than the typename information stored on the server, further comprising communicating an error message to the second client.

5. The one or more devices of claim 2, wherein if the typename information provided by the second client corresponds to the typename information stored on the server, further comprising communicating the data associated with the object, the one or more properties associated with the object, and the typename information for the object to the second client.

6. The one or more devices of claim 4, wherein when the error message is communicated to the second client, not communicating any object to the second client.

7. The one or more devices of claim 1, wherein the first client utilizes a dynamically typed language, which comprises one or more of APL, Erlang, Groovy, JavaScript, Lisp, Lua, MATLAB/GNU Octave, Perl, PHP, Prolog, Python, Ruby, Smalltalk, Clojure, or Tcl.

8. The one or more devices of claim 1, wherein the first client utilizes a strongly typed language, which comprises one or more of Java, C#, Pascal, Ada, C, or C++.

9. The one or more devices of claim 1, wherein the second client is a newly-written client that utilizes a strongly typed language.

10. The one or more devices of claim 1, wherein creating the correct instance of the object comprises creating a container of an appropriate size for the data that comprises the object.

11. The one or more devices of claim 1, wherein the data associated with the object comprises key value pairs that define a field name and a value for that field.

12. The one or more devices of claim 1, wherein without the typename information, the second client would not know how to create the correct instance of the object.

13. The one or more devices of claim 1, wherein the typename information is not language-specific.

14. The one or more devices of claim 1, wherein the first client and the second client, prior to creation of the object, agreed on sharing the object based on the typename information.

15. One or more tangible computer storage devices storing computer-useable instructions that, when used by one or more computing devices, cause the one or more computing devices to perform a method of enabling cross-language object sharing, the method comprising:
   storing, at a server, data, typename information, and properties associated with a plurality of objects that have been created for use by a plurality of clients, wherein the plurality of clients have previously agreed on a structure of the plurality of objects based on the typename information corresponding to each of the plurality of objects;
   receiving an open request from a first client of the plurality of clients to open an object of the plurality of objects, wherein the first client utilizes a strongly typed language;
   retrieving from the server the data, the typename information, and the properties associated with the requested object; and communicating the data, the typename information, and the properties associated with the requested object to the first client such that the first client, using the typename information, is able to create a correct instance of the object.

16. The one or more devices of claim 15, wherein the typename information comprises a typename associated with the object, and wherein the typename is associated with the object at a time of the object's creation.

17. The one or more devices of claim 15, wherein the object was created by a second client that utilizes a dynamically typed language.

18. The one or more devices of claim 17, wherein the dynamically typed language comprises one or more of APL, Erlang, Groovy, JavaScript, Lisp, Lua, MATLAB/GNU Octave, Perl, PHP, Prolog, Python, Ruby, Smalltalk, Clojure, or Tcl.

19. The one or more devices of claim 15, wherein the first client utilizes the strongly typed language, which comprises one or more of Java, C#, Pascal, Ada, C, or C++.

20. An object sharing system including one or more computing devices having one or more processors and one or more tangible computer storage devices, the object sharing system comprising:

- a create request receiving component that receives from a dynamically typed client a create request to create an object, wherein the create request includes typename information associated with the object, and wherein the dynamically typed client utilizes a dynamically typed language;
- an object creation component that creates the object according to the create request;
- a storing component that stores the typename information, one or more properties of the object, and data associated with the object;
- an open request receiving component that receives from a strongly typed client an open request to open the object, wherein the strongly typed client utilizes a strongly typed language; and
- a communication component that, upon a notification that the open request has been received, communicates the data associated with the object, the one or more properties associated with the object, and the typename information for the object to the strongly typed client such that the strongly typed client, using the typename information, is able to correctly utilize the data to create a correct instance of the requested object.

* * * * *